United States Patent
Christianson

(10) Patent No.: US 7,222,924 B2
(45) Date of Patent: May 29, 2007

(54) TRACK SYSTEM FOR A GROUND ENGAGING VEHICLE

(75) Inventor: Peter Christianson, Fargo, ND (US)

(73) Assignee: Fargo Products, LLC, Fargo, ND (US)

( * ) Notice: Subject to any disclaimer, the term of this patent is extended or adjusted under 35 U.S.C. 154(b) by 0 days.

(21) Appl. No.: 10/985,125

(22) Filed: Nov. 10, 2004

(65) Prior Publication Data

US 2005/0173984 A1  Aug. 11, 2005

Related U.S. Application Data

(60) Provisional application No. 60/518,914, filed on Nov. 11, 2003.

(51) Int. Cl.
*B62D 55/14* (2006.01)
(52) U.S. Cl. ............... 305/135; 305/125; 305/199
(58) Field of Classification Search ............ 305/195, 305/115, 119, 135, 124, 15, 143, 199, 129, 305/130, 131, 134, 142
See application file for complete search history.

(56) References Cited

U.S. PATENT DOCUMENTS

| | | | | |
|---|---|---|---|---|
| 1,297,104 | A * | 3/1919 | Colahan | 305/134 |
| 2,467,947 | A * | 4/1949 | Skelton | 180/9.5 |
| 2,934,327 | A * | 4/1960 | Lewis | 299/39.3 |
| 3,841,424 | A * | 10/1974 | Purcell et al. | 180/9.5 |
| 3,938,606 | A * | 2/1976 | Yancey | 180/9.5 |
| 4,953,919 | A * | 9/1990 | Langford | 305/144 |
| 5,240,084 | A | 8/1993 | Christianson | |
| 5,273,126 | A * | 12/1993 | Reed et al. | 180/9.21 |
| 5,452,949 | A * | 9/1995 | Kelderman | 305/129 |
| 5,842,757 | A * | 12/1998 | Kelderman | 305/125 |
| RE36,284 | E | 8/1999 | Kelderman | |
| 6,006,847 | A * | 12/1999 | Knight | 180/9.26 |
| 6,074,025 | A | 6/2000 | Juncker et al. | |
| 6,206,492 | B1 | 3/2001 | Moser | |
| 6,283,562 | B1* | 9/2001 | Tsubota et al. | 305/135 |
| 6,318,484 | B2 | 11/2001 | Lykken et al. | |
| 6,401,847 | B1 | 6/2002 | Lykken | |
| 6,536,854 | B2 | 3/2003 | Juncker et al. | |
| 6,543,862 | B1 | 4/2003 | Kahle et al. | |
| 6,557,953 | B1 | 5/2003 | Kahle et al. | |
| 2002/0130552 | A1 | 9/2002 | Juncker et al. | |
| 2004/0009038 | A1 | 1/2004 | Roth | |

FOREIGN PATENT DOCUMENTS

WO WO-04113154 A1 12/2004
WO WO-05047090 A1 5/2005

OTHER PUBLICATIONS

"International Search Report, For Application No. PCT/US2004/037671, date mailed Mar. 16, 2005", 14 Pages.

* cited by examiner

*Primary Examiner*—Russell D. Stormer
(74) *Attorney, Agent, or Firm*—Schwegman, Lundberg, Woessner & Kluth, P.A.

(57) ABSTRACT

A track system for a ground engaging vehicle such as a tractor is provided. Track systems shown include the ability to maintain existing gear ratios and vehicle speed when interchanging wheels with track systems as described above. Embodiments shown also exhibit improved support of the track system in relation to a vehicle axle that reduces stress problems associated with the axle or related components. Another feature includes pivoting the track system in a way that prevents the track system from rotating 360 degrees around the axle when large obstacles are encountered.

23 Claims, 12 Drawing Sheets

TRACK SYSTEM FOR A GROUND ENGAGING VEHICLE

RELATED APPLICATIONS

This application claims the benefit of U.S. Provisional Application Ser. No. 60/518,914, filed Nov. 11, 2003, which provisional application is incorporated herein by references.

TECHNICAL FIELD

This application relates to track systems and methods of their manufacture and use. Specifically, this application relates to a track system for tractors in agricultural use.

BACKGROUND

Tracked vehicles have a number of features that make them desirable over conventional treaded wheels. With a tracked configuration, the weight of a ground engaging vehicle, such as a tractor, is distributed over a larger surface area. This reduces damage to the ground as it is driven over. Further, tracked configurations have improved traction over treaded wheels due to the increased surface area in contact with the ground at any given time.

Treaded wheel vehicles, such as agricultural tractors, are relatively common. It is desirable to be able to convert common treaded wheel configuration of a ground engaging vehicle to a tracked vehicle in such as way that the cost of conversion to the user or manufacturer is low.

There are a number of problems to be addressed when designing a tracked vehicle product. It is desirable to maintain the gearing ratio of existing treaded wheel vehicles so that vehicle speed is similar in the converted vehicle. It is also desirable to reduce unwanted stresses on the vehicle axle and related components. It is also desirable to provide ample ground clearance adjacent to a track system. It is also desirable to maintain a vehicle height where the vehicle axle and attachment devices such as three-point hitches are located within standard working height ranges. It is also desirable to provide neutral rotational torque to a track system under various driving load of the tracked vehicle.

In operation, some tracked assemblies pivot about the vehicle axle in order to conform to ground features as the vehicle travels. Another technical hurdle with tracked vehicle designs is a tendency for the tracks to rotate 360 degrees back around the axle upon hitting a large change in ground features such as hole or a sharp rise, etc. Further, in configurations where tracked assemblies pivot about the vehicle axle, the pulling of heavy loads tends to cause the tracked assemblies to heel back onto the rear of the tracked assembly thus reducing a contact area of the tracked assembly with the ground.

What is needed is a track system that can be interchanged with a wheel on a conventional treaded wheel vehicle. What is also needed is a track system that is inexpensive to manufacture, and addresses technical/operational hurdles including, but not limited to those listed above.

DETAILED DESCRIPTION

Figure 1:
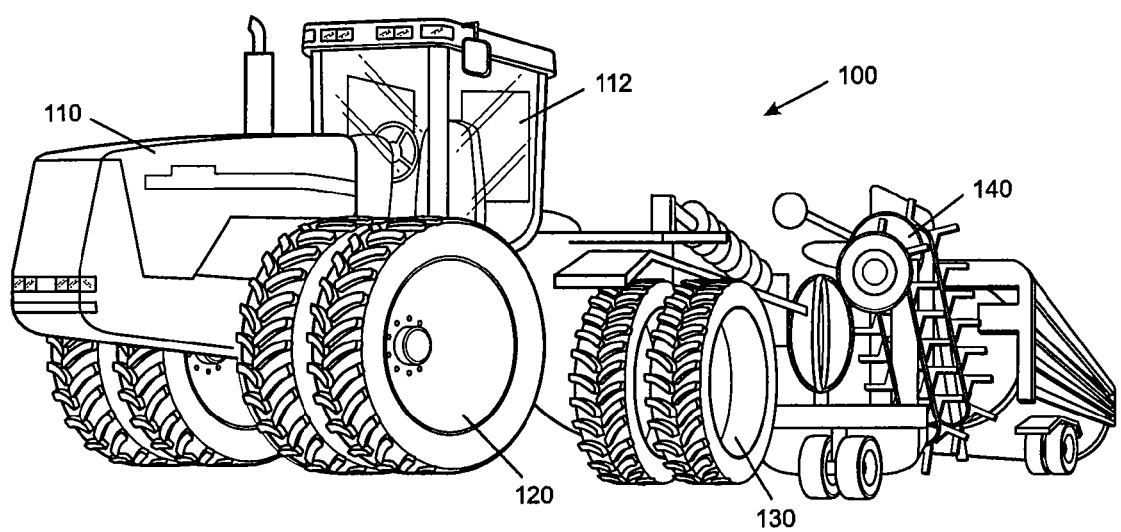
FIG. 1 shows an isometric view of one example of a ground engaging vehicle according to the prior art.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical changes, etc. may be made without departing from the scope of the present invention. Although the following description uses an agricultural tractor to illustrate embodiments of the present invention, one of ordinary skill in the art, having the benefit of the present disclosure will recognize that track assemblies and methods described below can be used with a number of ground engaging vehicles apart from agricultural tractors.

FIG. 1 shows an example of a ground engaging vehicle 100. In one embodiment, the ground engaging vehicle 100 includes an agricultural tractor, although the invention is not so limited. FIG. 1 further shows a vehicle body 110 with an operator cab portion 112. Other embodiments of tractors without cab portions are also within the scope of the invention. A number of front wheels 120 are shown, and a number of rear wheels 130 are shown. Examples of agricultural tractors includes two wheel drive tractors, four wheel drive tractors, articulated tractors, etc. In one embodiment, the ground engaging vehicle 100 is capable of mounting multiple wheels on each side of an axle as shown in FIG. 1. The ground engaging vehicle 100 is shown in a common ground working operation, pulling an implement 140, such as a plow.

Figure 2:
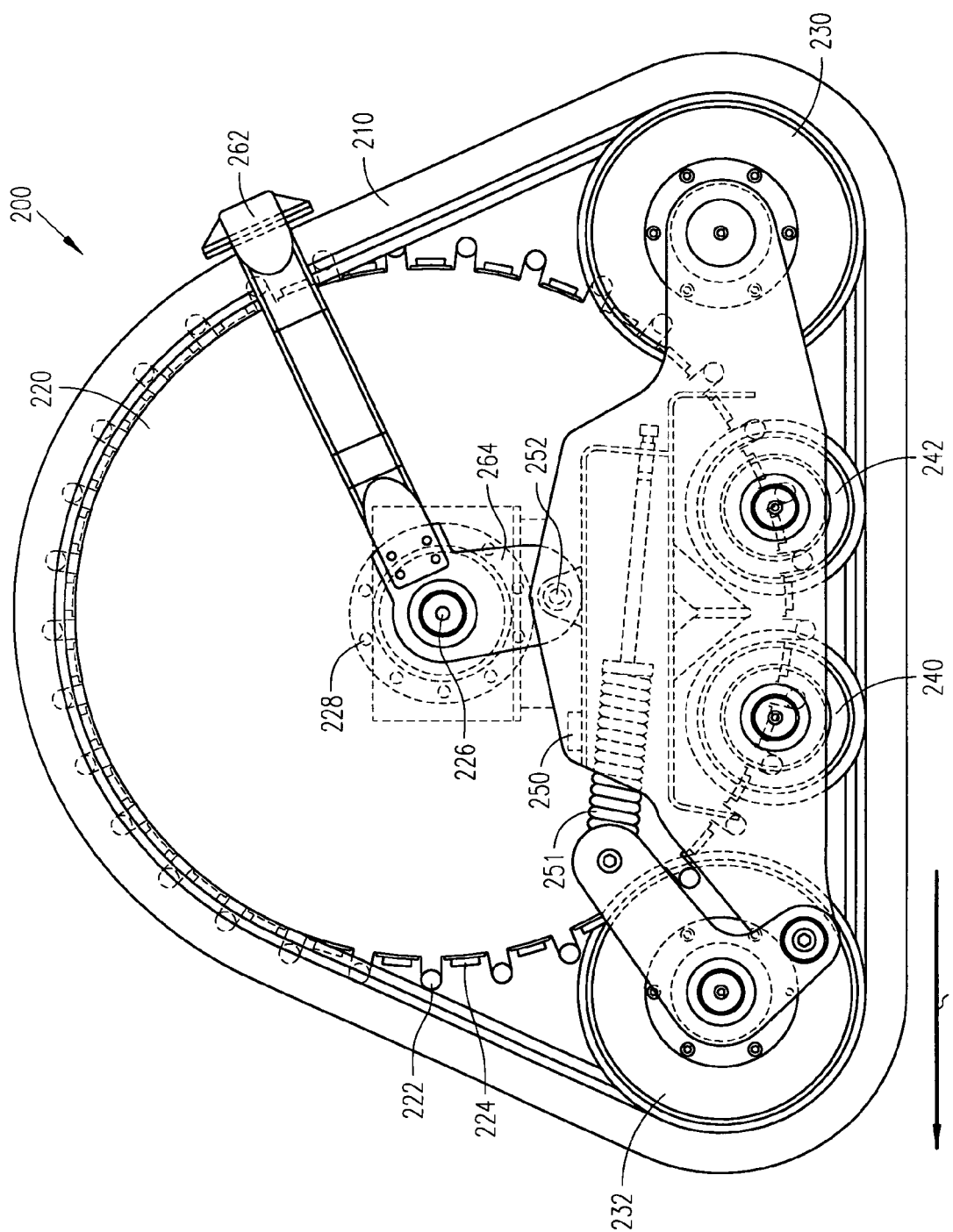
FIG. 2 shows a side view of a track assembly according to an embodiment of the invention.

FIG. 2 shows a track system 200 according to an embodiment of the invention. The track system 200 includes a first bogey wheel 240, a second bogey wheel 242, a first idler wheel 230, a second idler wheel 232 and a drive wheel 220. A forward direction of travel is indicated by arrow 201. A track 210 is shown passing around the bogey wheels 240, 242 and the idler wheels 230, 232 with the drive wheel 220 engaging an inside portion of the track 210. Embodiments of tracks 210 include polymer or rubber tracks with flexible elastic properties. Other embodiments of tracks include jointed segments with individual pivot joint between segments. Although two sets of bogey wheels are shown, the present invention is not so limited. Multiple numbers of sets of bogey wheels, or a single set of bogey wheels are also within the scope of the invention.

The drive wheel 220 includes a rotation center 226 and a number of securing features 228. In one embodiment, the securing features 228 include holes for lug bolts to pass through in order to secure the drive wheel 220 to a hub of a ground engaging vehicle. In one embodiment, the drive wheel 220 includes a number of engaging features 222 and a number of aligning features 224.

A first guide frame member 250 is shown coupling the first bogey wheel 240, the second bogey wheel 242, the first idler wheel 230, and the second idler wheel 232 together. In one embodiment, a first tensioner system 251 is included to maintain track tension. In one embodiment, the first tensioner system 251 includes a compression spring. In one embodiment, the first tensioner system 251 engages an idler wheel at the front of the track system to reduce unwanted compression of the tensioner system 251 due to driving forces in the track 210. A first support frame 264 is also shown in FIG. 2. In one embodiment, the first support frame 264 is coupled to the first guide frame member 250 at a first pivot joint 252. A linking frame member 262 is also shown in FIG. 2. In one embodiment the linking frame member 262 couples the first support frame 264 to a second support frame shown in subsequent figures. In one embodiment, the linking frame member 262 includes multiple portions that are bolted or otherwise fastened together. In one embodiment, the linking frame member 262 includes a continuous frame member, either integrally formed or welded to form a single unit.

Figure 3:
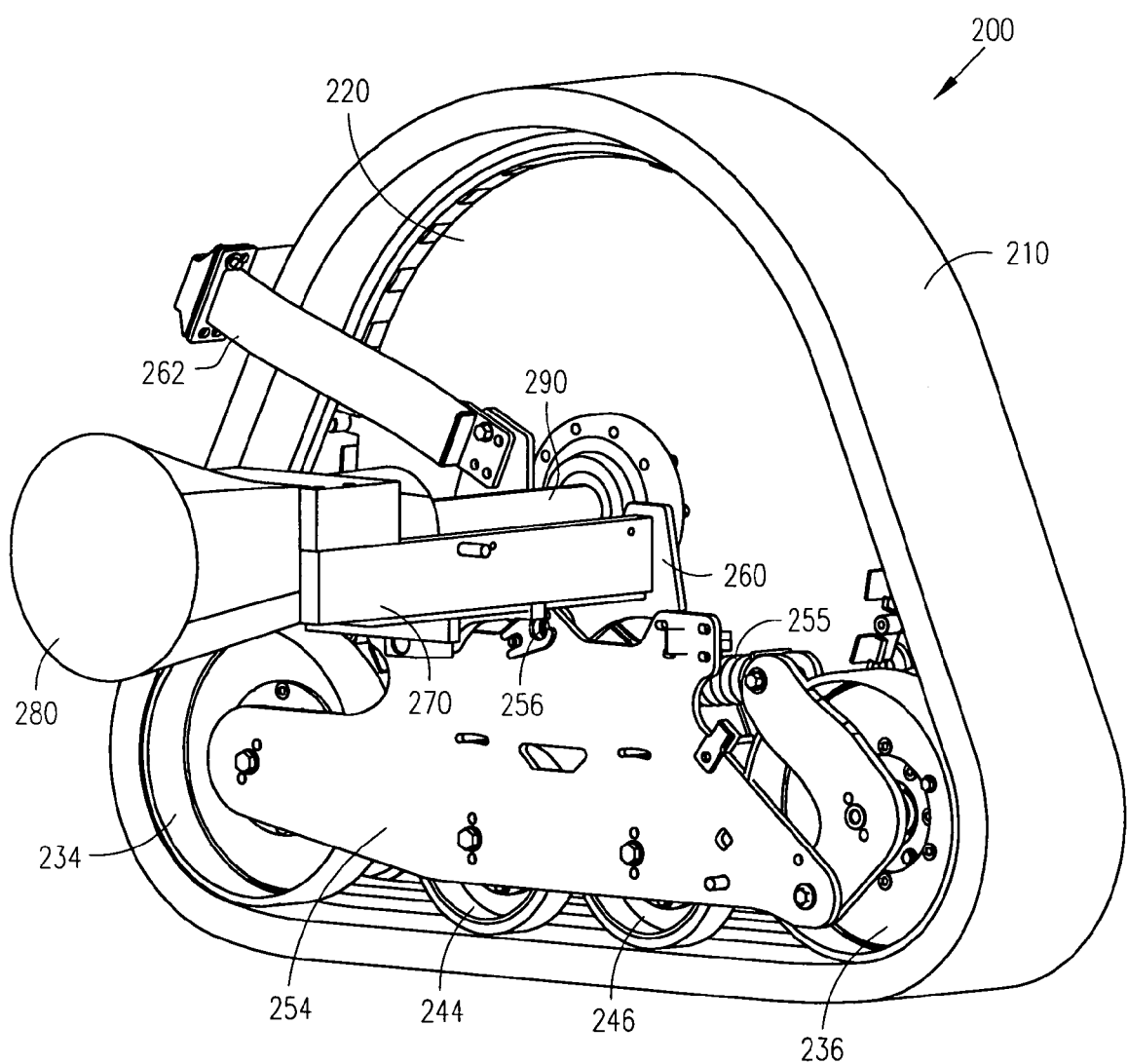
FIG. 3 shows an isometric view of a track assembly according to an embodiment of the invention.

FIG. 3 shows an inside view of the track system 200. A portion of a ground engaging vehicle is shown to illustrate possible methods of attachment of the track system 200 to the ground engaging vehicle. An axle trumpet housing 280 is shown, with an axle 290 protruding from the trumpet housing 280.

On the inside of the track system 200, a third bogey wheel 244, a fourth bogey wheel 246, a third idler wheel 234, and a fourth idler wheel 236 are shown. A second guide frame member 254 is shown coupling the third bogey wheel 244, the fourth bogey wheel 246, the third idler wheel 234, and the fourth idler wheel 236 together. In one embodiment, a second tensioner system 255 is included to maintain track tension. In one embodiment, the second tensioner system 255 includes a compression spring. A second support frame 260 is also shown in FIG. 3. In one embodiment, the second support frame 260 is coupled to the second guide frame member 254 at a second pivot joint 256. The linking frame member 262 is also shown in FIG. 3, linking the second support frame 260 to the first support frame 264.

In one embodiment, an attachment member 270 is included between the second support frame 260 and the axle trumpet housing 280. In one embodiment, the attachment member 270 is integrally formed with the second support frame 260. In one embodiment, the attachment member 270 is welded, or otherwise attached to the second support frame 260. The attachment member 270 provides support on the inside portion of the track system 200 by transferring load forces from the track system 200 so that they are born on a body of the vehicle. In one embodiment, the attachment member 270 is coupled to the axle trumpet housing 280. Although the trumpet housing 280 is one location for coupling to the body of the vehicle, other portions of the vehicle can be used for coupling with the attachment member 270, such as a vehicle frame, etc.

In one embodiment, this configuration relieves the axle 290 of flexing stresses that can cause metal fatigue problems. Flexing fatigue issues are accentuated in some configurations due to a mounting surface of the axle 290 being located at a distal end of the axle 290. In addition to fatigue issues, distal end mounting of track systems put large stresses on axle bearings. Embodiments of the invention described in the present description further reduce unwanted axle bearing stresses. In one embodiment, the attachment member 270 extends substantially parallel to the axle 290, and reduces fatigue, axle bearing stress, etc. without compromising ground clearance of the vehicle.

Figure 4:
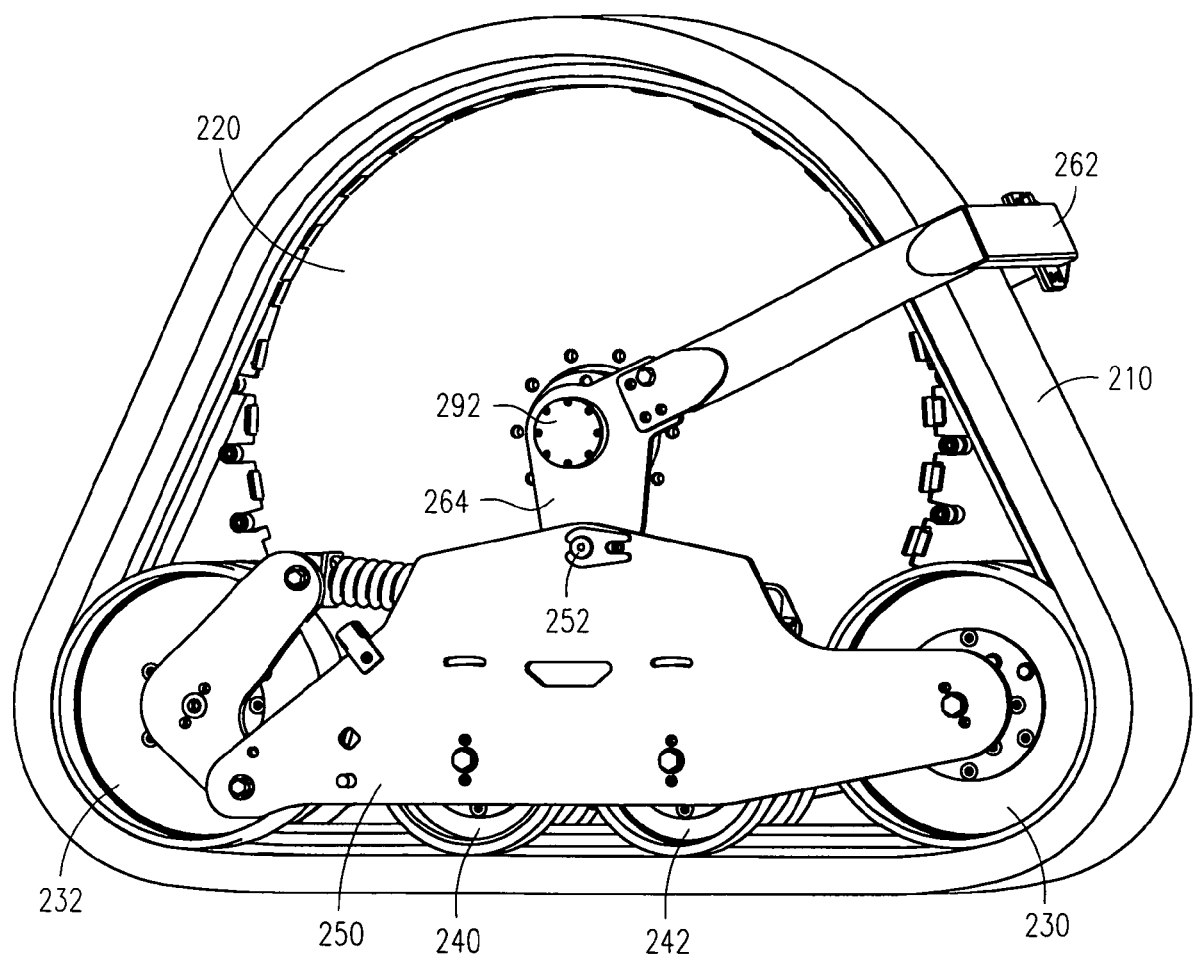
FIG. 4 shows another isometric view of a track assembly according to an embodiment of the invention.

FIG. 4 shows an outside view of the track system 200. In one embodiment, the first support frame 264 provides support on the outside portion of the track system 200 by transferring load forces from the track system 200 so that they are born on the axle 290. In one embodiment, the track system is supported on both the inside and the outside of the track system 200 to reduce flexural forces on the axle that could lead to fatigue problems. In one embodiment, the second support frame 260 and the attachment member 270 provide support between the guide frame members 250, 254 and the body of the vehicle. In one embodiment, the first support frame 264 provides support between the guide frame members 250, 254 and the axle 290. In one embodiment, a truss like structure is formed. In contrast to only an axle 290 supporting the track system, in one embodiment, the axle forms a top member of a truss support, while the attachment member 270 forms a bottom member of a truss support.

In configurations where a guide frame is coupled to a body of a tractor and the axle bears no weight of the tractor, flexural forces can still be high. In configurations where an axle does not bear the weight of the tractor, the axle is still pulled downwards towards the ground due to tension in the track during operation. A combination of support to the body of the vehicle and support to the axle reduces unwanted stresses such as fatigue stresses and axle bearing stresses.

Although in selected embodiments the first support frame 264 is coupled to an outside portion of the track system 200, the invention is not so limited. In one embodiment, coupling to the axle 290 includes coupling to an inside portion of the track system. In one embodiment, coupling to an inside portion of the track system includes coupling a bearing between the second support frame 260 and the axle 290 on the inside of the drive wheel 220. In one embodiment, the first support frame 264 is coupled to the axle 290 using an axle extension 292 as shown in FIG. 4. In one embodiment, the first support frame 264 is coupled over the axle 290 itself. The axle extension 292 shown in FIG. 4 includes a bearing assembly with a diameter that is reduced from the axle diameter, although the invention is not so limited. In one embodiment, reducing the diameter of the bearing from the diameter of the axle provides a manufacturing cost savings by using a less expensive bearing assembly.

Figure 5:
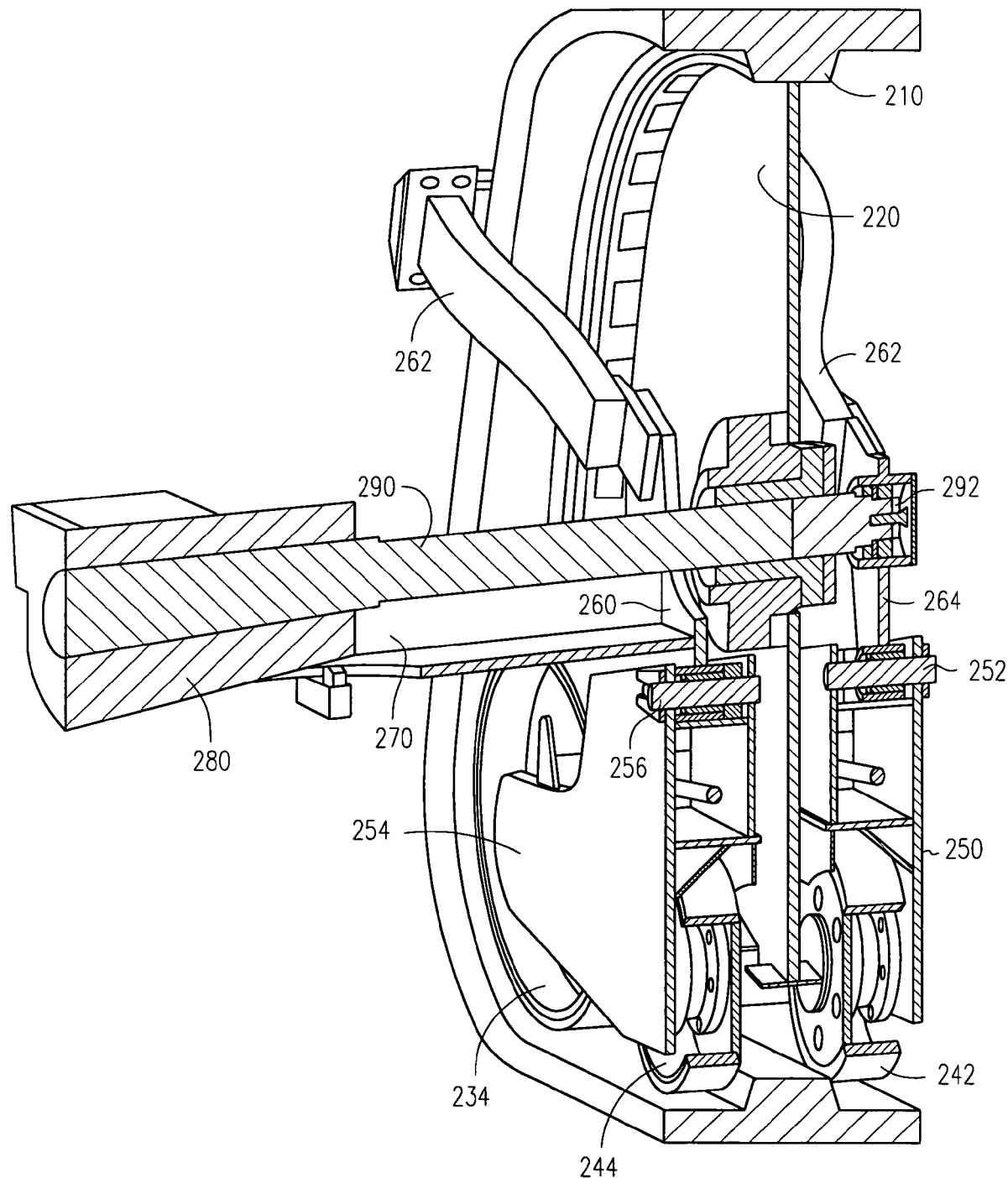
FIG. 5 shows a cross section view of a track assembly according to an embodiment of the invention.

In one embodiment, the track system is allowed to pivot in order for the tracks to conform to variations in ground terrain. In one embodiment, the track system pivots about the first pivot joint 252 and the second pivot joint 256. As shown in FIG. 4 and FIG. 5, the first pivot joint 252 and the second pivot joint 256 are located below the axle 290. In one embodiment, the linking frame 262 maintains an alignment between the first support frame 264 and the second support frame 260. In one embodiment, location of the first pivot joint 252 and the second pivot joint 256 is determined by summing moment forces acting on the track system during operation such as tension from the track, etc. and locating the pivot joints where there the moment forces cancel each other out. In one embodiment, location of the first pivot joint 252 and the second pivot joint 256 below the axle 290 cancels the moment forces and provides a neutral rotational track system while pulling any payload with the tractor. Further, location of the first pivot joint 252 and the second pivot joint 256 below the axle 290 provides an advantage where the track system 200 will not rotate 360 degrees back around the axle 290 after encountering a large obstacle. In contrast, other configurations with track systems that pivot about the axle 290 may encounter this problem.

FIG. 5 also illustrates the drive wheel 220 passing through the middle of bogey wheels 242 and 244, as well as the pairs of idler wheels 254, etc. One advantage of grouping a number of idler and bogey wheels together on the first guide frame member 250 and a number of idler and bogey wheels together on the second guide frame member 254 includes the ability to use a large diameter drive wheel 220 passing though the middle of the first guide frame member 250 and the second guide frame member 254. In one embodiment, the drive wheel 220 is approximately 92% of the size of an existing treaded wheel from a vehicle such as a tractor. In one embodiment the drive wheel 220 is substantially the same size as an existing treaded wheel from a vehicle such as a tractor. Additionally, because no axles of guide wheels or bogey wheels are located beneath the drive wheel 220, there is space to locate the drive wheel 220 directly adjacent to the track 210, which is close to the ground. It is important to locate the drive wheel 220 close to the ground to avoid a vehicle configuration with too high a center of gravity that may reduce vehicle stability. It is also important to locate the drive wheel 220 close to the ground to maintain accepted industry standards for axle height and height of features such as draw bars, or three-point hitches, etc. In configurations with a drive wheel 220 that is substantially the same diameter as a treaded wheel, these issue becomes increasingly important.

One advantage of drive wheels 220 that are similar in size to a treaded wheel includes a gearing ratio that is similar to existing treaded wheel vehicles such as tractors. If the track system 200 is used to interchange with a wheel from a vehicle such as a treaded wheel tractor, the user will come to expect a certain speed of the vehicle in each of the vehicles existing gears. If the drive wheel 220 is too small or too large, the speed relative speed of the vehicle in each gear will change. While it is possible to compensate for differences in drive wheel size using gear boxes, reduction mechanisms, etc. it is substantially less expensive to use a drive wheel that is similar in size to the original treaded wheel.

Figure 6:
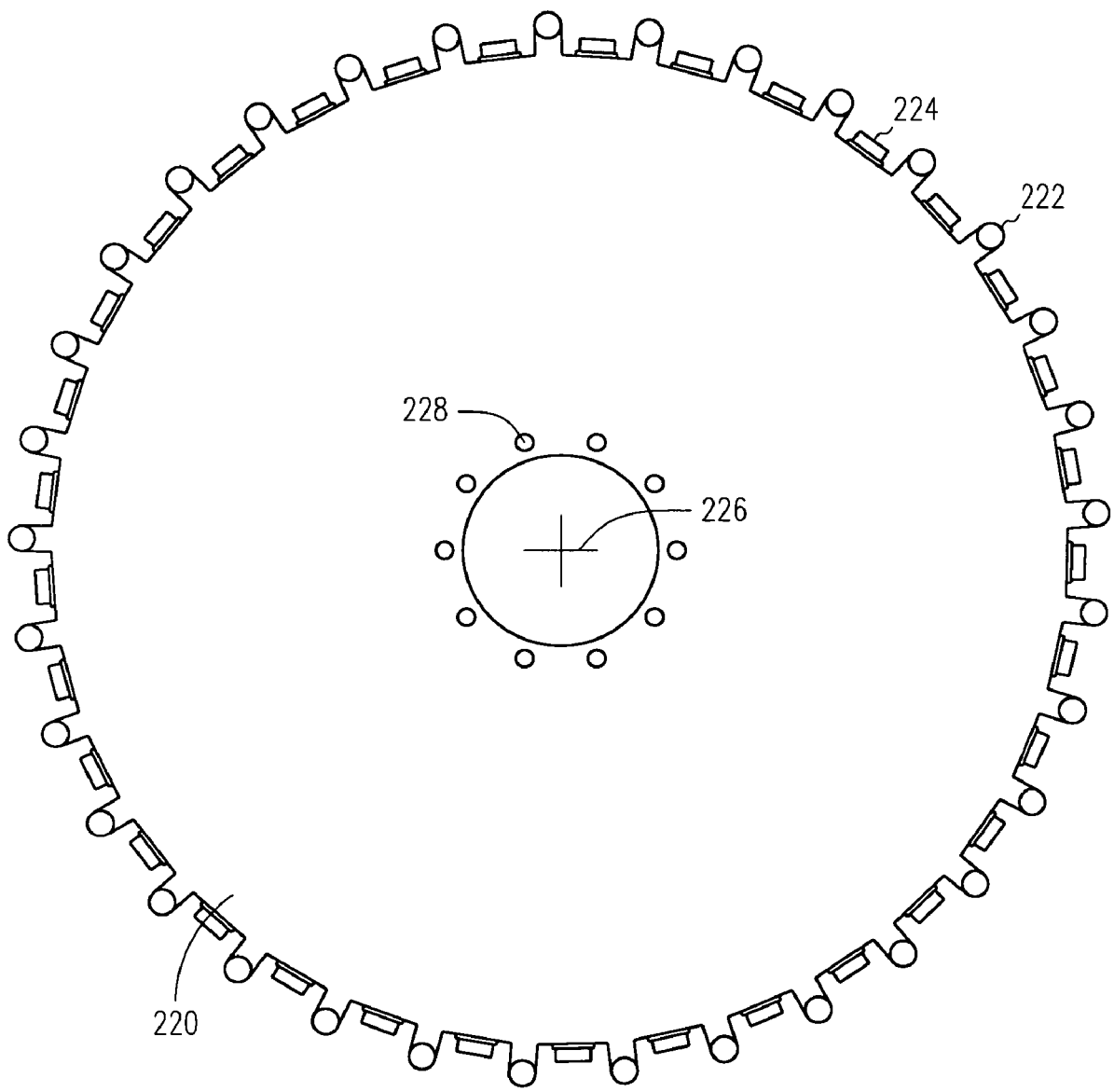
FIG. 6 shows a side view of a drive wheel according to an embodiment of the invention.

FIG. 6 shows one embodiment of a drive wheel 220. Other embodiments of drive wheels 220 are also used in selected embodiments of the invention. A drive center 226 is shown with a number of securing features 228 as discussed in embodiments above. In one embodiment, the drive wheel 220 includes both a number of track engaging features 222 and a number of side aligning features 224.

Figure 7:
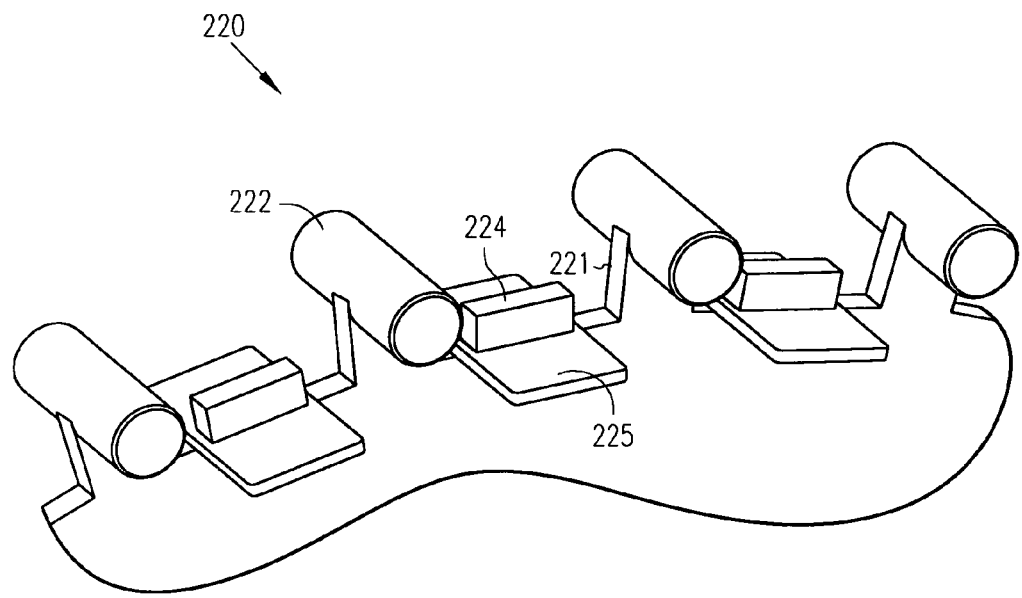
FIG. 7 shows an isometric view of a portion of a drive wheel according to an embodiment of the invention.

FIG. 7 shows a close up view of the track engaging features 222 and the number of side aligning features 224. In one embodiment, the track engaging features 222 are attached to the end of teeth 221 on the drive wheel 220. In one embodiment, the track engaging features 222 are welded onto the teeth 221 of the drive wheel 220. In one embodiment, the track engaging features 222 are bolted, or otherwise mechanically attached onto the teeth 221 of the drive wheel 220. In one embodiment, the track engaging features 222 are used only to drive the tread forward, and not to align the tread over the bogey wheels or the idler wheels. In one embodiment, the number of side aligning features 224 are designed to mate with corresponding features in the tread that provide alignment of the tread in the track system 200. In one embodiment, a number of surfaces 225 are further included to spread the force of the track against the drive wheel 220. In one embodiment, the number of surfaces 225 are shaped as an arc, or part of a cylinder with a center of the arc 226 as shown in FIG. 6. In one embodiment, the number of surfaces 225 are substantially planar, with no concave or convex curvature to them. In one embodiment, the number of surfaces 225 form an interface with the track lugs.

Figure 8:
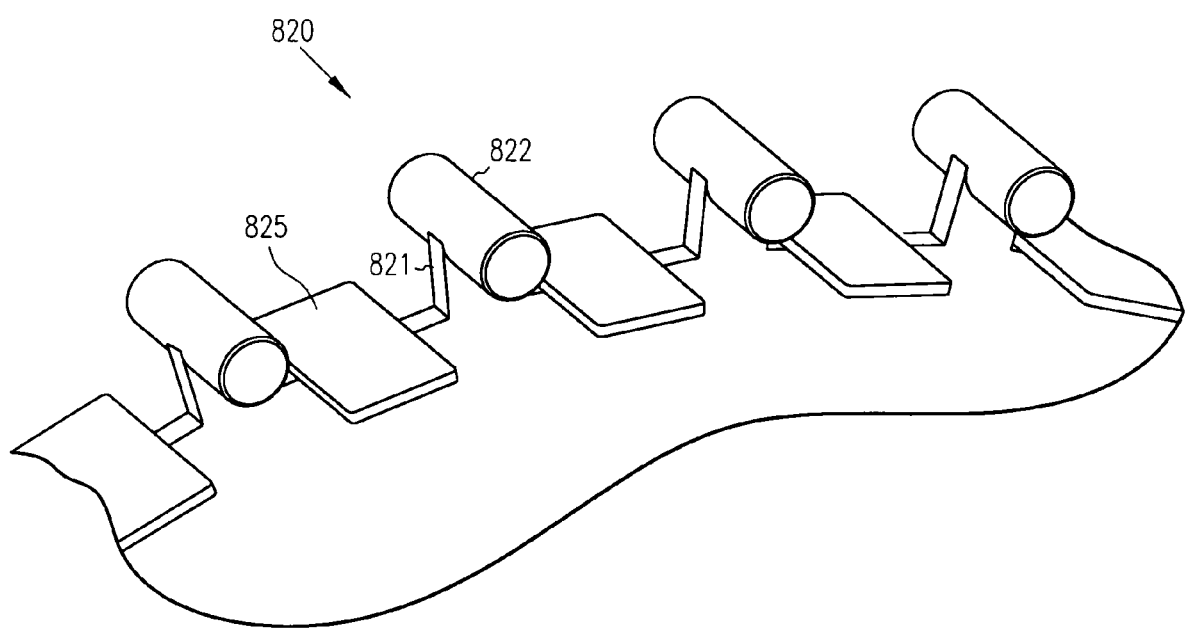
FIG. 8 shows an isometric view of a portion of another drive wheel according to an embodiment of the invention.

FIG. 8 shows a drive wheel 820 according to another embodiment of the invention. The drive wheel 820 includes a number of track engaging features 822. In one embodiment, the track engaging features 822 are attached to the end of teeth 821 on the drive wheel 820. The drive wheel 820 further includes a number of surfaces 825. In one embodiment, the number of surfaces 825 are shaped as an arc, or part of a cylinder. In one embodiment, the number of surfaces 825 are substantially planar, with no concave or convex curvature to them.

Figure 9A:
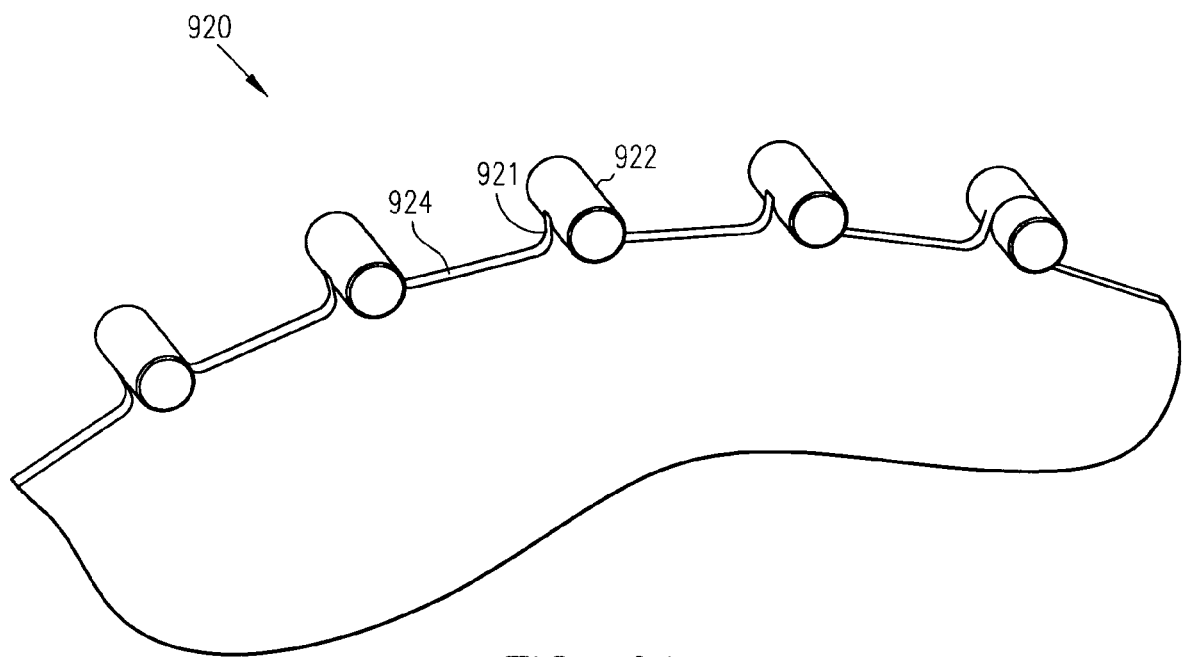
FIG. 9A shows an isometric view of a portion of another drive wheel according to an embodiment of the invention.

FIG. 9A shows a drive wheel 920 according to another embodiment of the invention. The drive wheel 920 includes a number of track engaging features 922. In one embodiment, the track engaging features 922 are attached to the end of teeth 921 on the drive wheel 920. Also shown in FIG. 9A are a number of troughs 924 located between the number of teeth 921. In one embodiment, the number of troughs 924 form an interface with the track against the drive wheel 920. In one embodiment, the number of troughs 924 further provide side alignment for a track by engaging a corresponding feature such as a slot in the track.

Figure 9B:
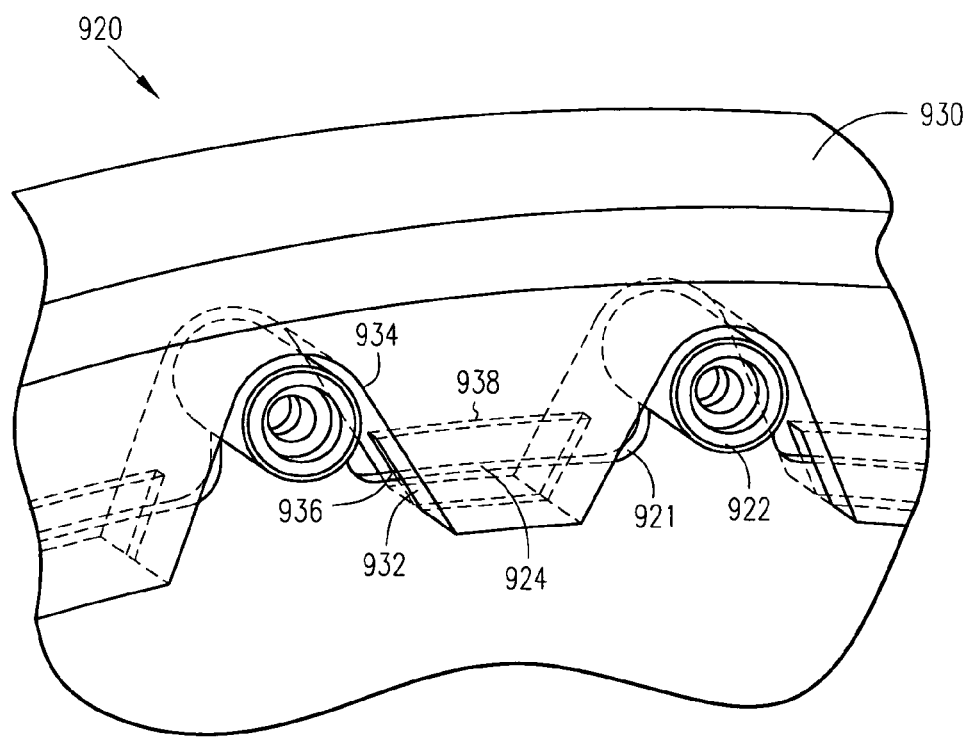
FIG. 9B shows an isometric view of a portion of a drive wheel and track portion according to an embodiment of the invention.

FIG. 9B further shows the drive wheel 920 from FIG. 9A engaging a portion of a track 930 according to one embodiment of the invention. A number of drive lugs 932 are shown engaging the number of track engaging features 922. The track engaging features mate with recessed portions 934 that are located between drive lugs 932. In one embodiment, an aligning feature 936 such as a slot is included on the drive lugs 932. Although a slot is shown, other geometries are possible. In one embodiment, a base 938 of a groove forms an interface with a trough 924.

Figure 10A:
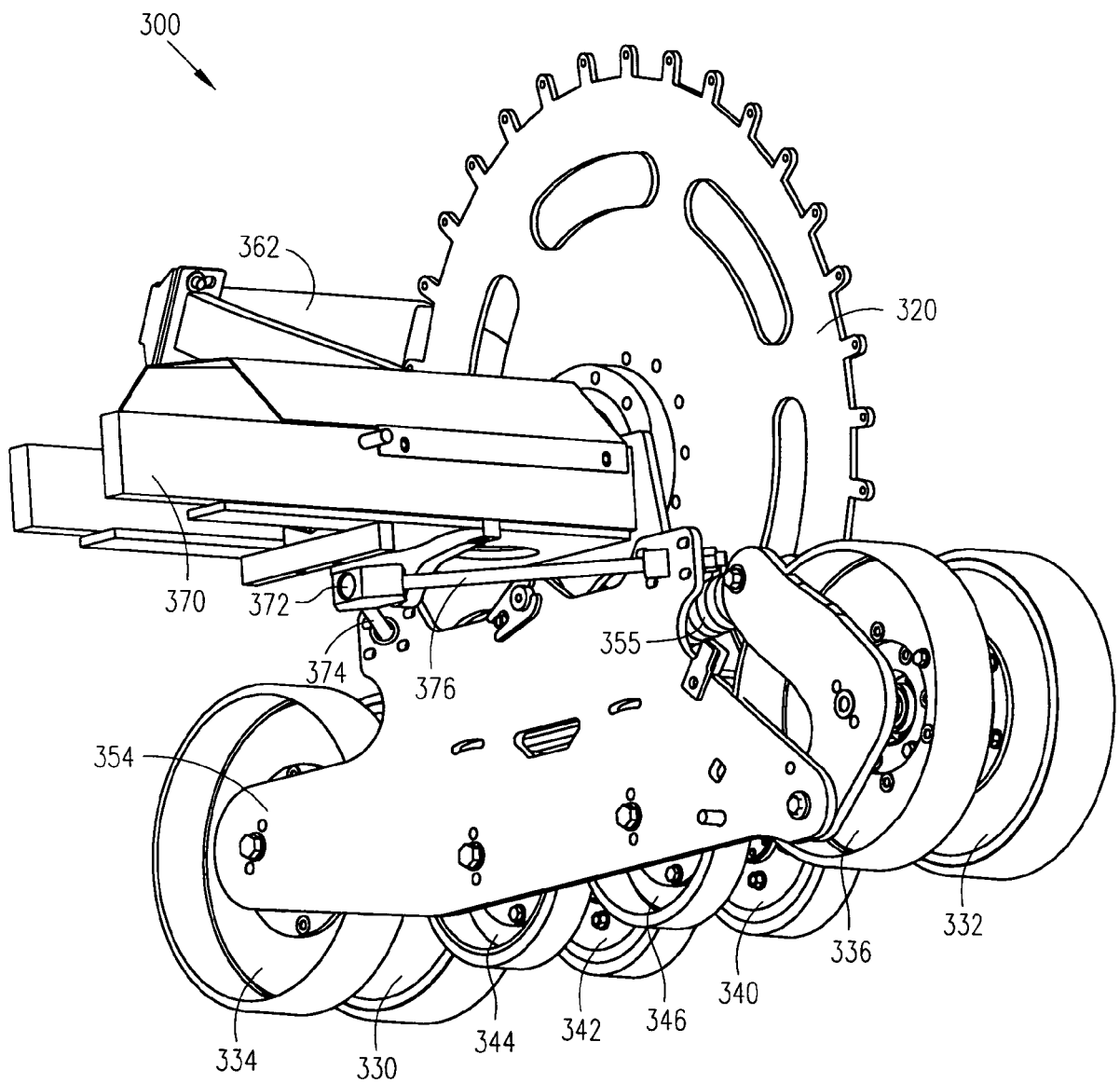
FIG. 10A shows an isometric view of a track assembly according to an embodiment of the invention.

FIG. 10A shows an inside view of a track system 300 according to an embodiment of the invention. The track system 300 includes a first bogey wheel 340, a second bogey wheel 342, a first idler wheel 330, a second idler wheel 332 and a drive wheel 320. Also shown in FIG. 10A are a third bogey wheel 344, a fourth bogey wheel 346, a third idler wheel 334, and a fourth idler wheel 336. A second guide frame member 354 is shown coupling the third bogey wheel 344, the fourth bogey wheel 346, the third idler wheel 334, and the fourth idler wheel 336 together. In one embodiment, a tensioner system 355 is included to maintain track tension. A linking frame member 362 is also shown in FIG. 10A. Similar to embodiments described above, the linking frame member 362 maintains alignment between support frames on either side of the drive wheel 320.

In one embodiment, a torsion stabilizer 372 is included. The torsion stabilizer 372 shown in FIG. 10A includes a first connector 374 and a second connector 376. In one embodiment, the first connector 374 and the second connector 376 include threaded, or partially threaded rods for assembly purposes. In one embodiment, the first connector 374 and the second connector 376 provide structural support, and are not adjustable.

One advantage of embodiments using a torsion stabilizer 372 includes increased steering performance. During an aggressive steering maneuver, torsional forces are transmitted to each track system 300. Twisting of the track system 300 in relation to the vehicle as a result of torsional forces is undesirable. Torsional stabilizers 372 maintain a relationship of the track system 300 to the vehicle.

Figure 10B:
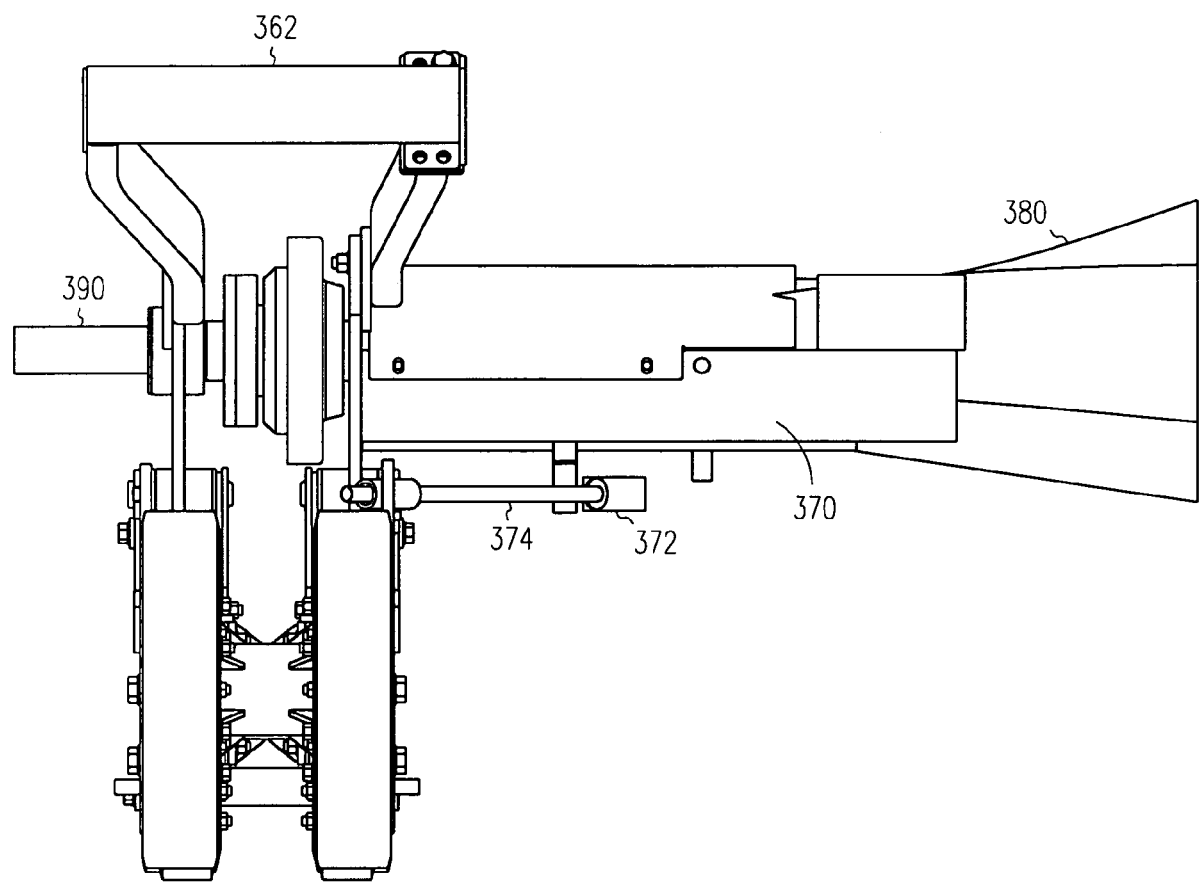
FIG. 10B shows an end view of a track assembly according to an embodiment of the invention.
Figure 10C:
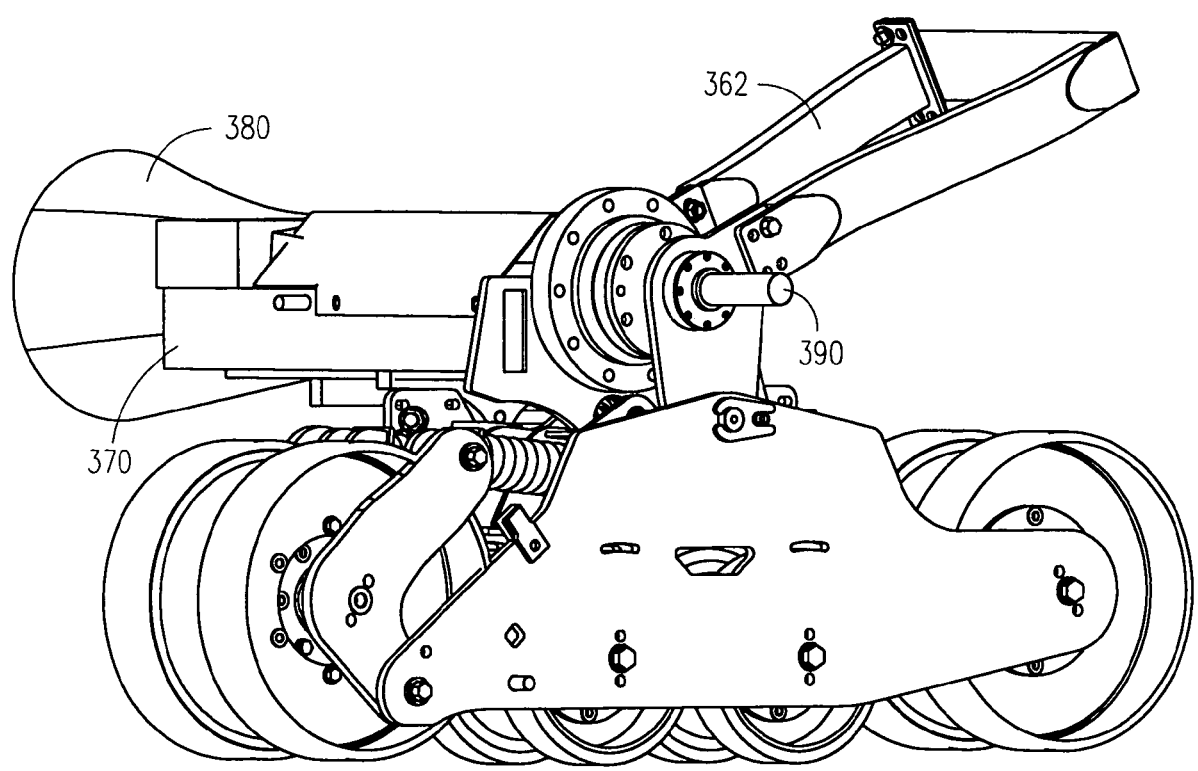
FIG. 10C shows another isometric view of a track assembly according to an embodiment of the invention.

FIG. 10B shows the track system 300 from an end view. The torsion stabilizer 372 is visible from this angle as well. FIGS. 10B and 10C further show the track system 300 mounted on a trumpet housing 380 of a tractor. An axle 390 is also shown in FIGS. 10B and 10C. In one embodiment, mounting of the track system 300 is similar to embodiments described above. As discussed above, in one embodiment, the linking frame member 362 maintains alignment between support frames of the track system 300.

Figure 11:
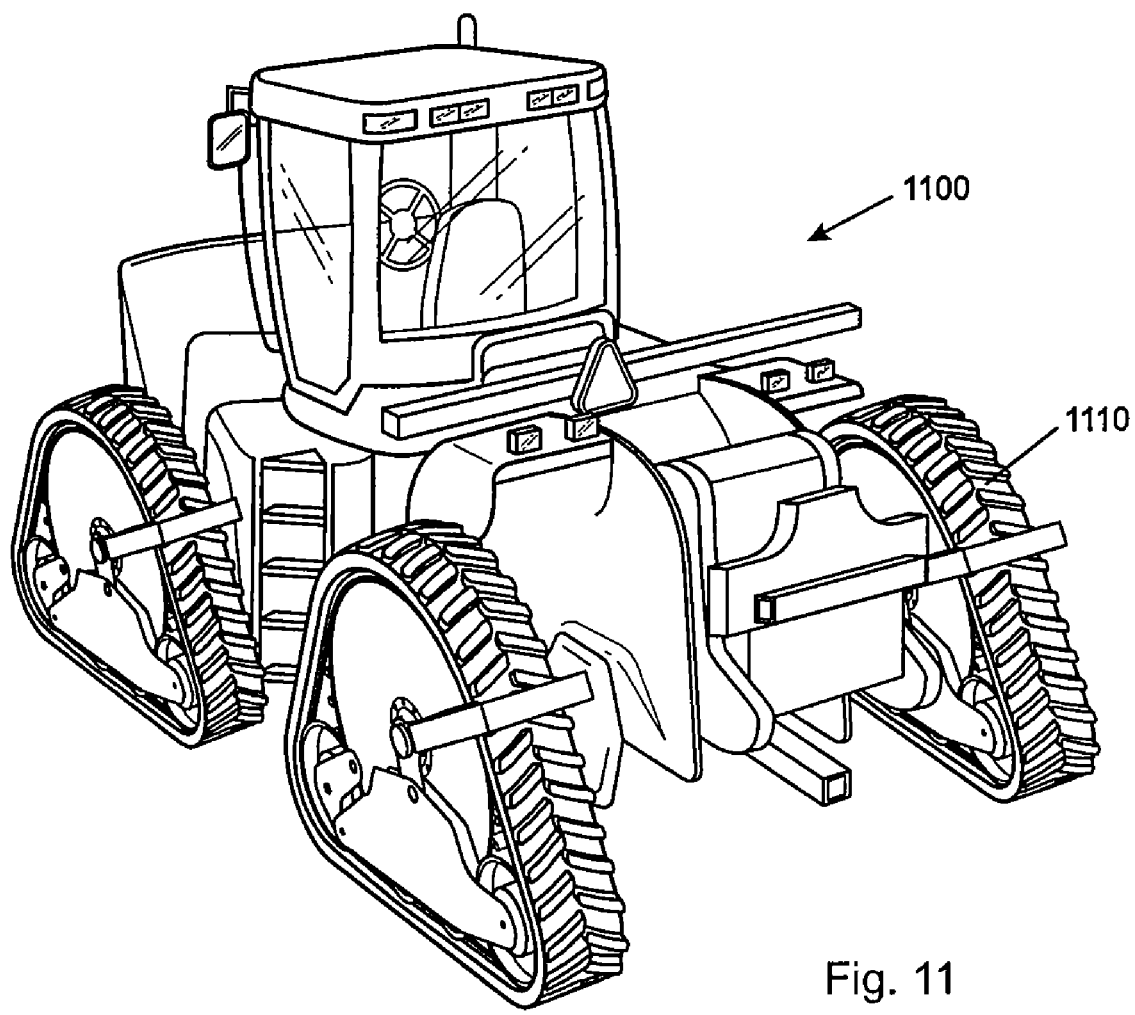
FIG. 11 shows an isometric view of one example of a ground engaging vehicle according to an embodiment of the invention.

FIG. 11 shows an example of a ground engaging vehicle 1100 equipped with track systems 1110 as described in embodiments above. In one embodiment, the ground engaging vehicle 1100 includes an agricultural tractor, although the invention is not so limited.

CONCLUSION

Using embodiments described above, a number of advantages are realized. One advantage includes the ability to maintain existing gear ratios and vehicle speed when interchanging wheels on wheeled vehicles with track systems as described above. Another advantage includes improved support of the track system in relation to a vehicle axle that reduces unwanted stresses such as fatigue problems in the axle. Another advantage includes high ground clearance adjacent to track systems. Another advantage includes pivoting the track system in a way that provides a neutral rotational torque during operation, and prevents the track system from rotating 360 degrees around the axle when large obstacles are encountered. Another advantage includes the ability to attach track systems to existing vehicle configurations at a variety of widths without putting undue stress on elements such as vehicle axles. In one embodiment available spacing of tracks includes, but is not limited to 88 inch, 120 inch and 144 inch spacing.

Although selected advantages are detailed above, the list is not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A track system for a ground engaging vehicle, comprising:
    a drive wheel for attachment to an axle of the ground engaging vehicle, the drive wheel having a diameter that is substantially the same as a diameter of an existing wheel of the ground engaging vehicle;
    a number of guide wheels coupled to a guide wheel frame, wherein axles of the a number of guide wheels are positioned to allow the drive wheel to pass below a number of centers of rotation of the number of guide wheels;
    a track system pivot joint adapted for pivoting substantially directly below the axle; and
    a flexible track that engages the drive wheel and is guided by the number of guide wheels.

2. The track system of claim 1, wherein the flexible track includes a groove for side alignment with the drive wheel.

3. The track system of claim 1, wherein the drive wheel passes between the number of guide wheels.

4. The track system of claim 1, wherein the number of guide wheels coupled to the guide wheel frame includes a number of guide wheels coupled between two plates.

5. A track system for a ground engaging vehicle, comprising:
    a number of guide wheels coupled to a guide wheel frame;
    a drive wheel for attachment to an axle of the ground engaging vehicle;
    a flexible track that engages the drive wheel and is guided by the number of guide wheels;
    a first support member coupled between the guide wheel frame and the ground engaging vehicle, wherein the first support member provides support from the guide wheel frame to a body portion of the ground engaging vehicle;
    a second support member coupled between the guide wheel frame and the ground engaging vehicle, wherein the second support member provides support from the guide wheel frame to the axle of the ground engaging vehicle; and
    a track system pivot joint located below the axle.

6. The track system of claim 5, wherein axles of the number of guide wheels are positioned to allow the drive wheel to pass below a number of centers of rotation of the number of guide wheels.

7. The track system of claim 5, wherein the flexible track includes a groove for side alignment with the drive wheel.

8. The track system of claim 5, wherein the body portion of the ground engaging vehicle includes a tractor trumpet housing.

9. The track system of claim 5, wherein the body portion of the ground engaging vehicle includes a tractor frame.

10. The track system of claim 5, wherein the second support member couples to the axle on a portion that is on an outside of the track system.

11. The track system of claim 6, wherein the second support member provides support from the guide wheel frame to an axle extension that is coupled to the axle of the ground engaging vehicle.

12. The track system of claim 11, wherein the axle extension includes a bearing assembly with an inner diameter that is smaller than an outer diameter of the axle of the ground engaging vehicle.

13. A track system for a ground engaging vehicle, comprising:
    a number of guide wheels coupled to a guide wheel frame;
    a drive wheel, having a drive axis of rotation;
    a flexible track that engages the drive wheel and is guided by the number of guide wheels;

a support frame coupled between the ground engaging vehicle and the guide wheel frame, wherein the support frame provides support on both an inside and an outside portion of the drive wheel, wherein at least a portion of the support frame couples to an axle of the ground engaging vehicle; and a track system pivot joint located between the support frame and the guide wheel frame, the track system pivot joint located below the axle and disposed generally along a vertical line extending downwardly from the axle.

14. The track system of claim 13, wherein axles of the number of guide wheels are positioned to allow the drive wheel to pass below a number of centers of rotation of the number of guide wheels.

15. The track system of claim 13, wherein the support frame provides support from the guide wheel frame to an axle extension that is coupled to the axle of the ground engaging vehicle.

16. A tractor, comprising:

a body portion;

an engine coupled to the body portion;

at least two track systems coupled through a transmission to the engine, each track system including:
 a number of guide wheels coupled to a guide wheel frame;
 a drive wheel for attachment to an axle of the ground engaging vehicle;
 a flexible track that engages the drive wheel and is guided by the number of guide wheels;
 a first support member coupled between the guide wheel frame and the ground engaging vehicle, wherein the first support member provides support from the guide wheel frame to a body portion of the ground engaging vehicle;
 a second support member coupled between the guide wheel frame and the ground engaging vehicle, wherein the second support member provides support from the guide wheel frame to the axle of the ground engaging vehicle; and
 a track system pivot joint located below the axle.

17. The tractor of claim 16, wherein axles of the number of guide wheels are positioned to allow the drive wheel to pass below a number of centers of rotation of the number of guide wheels.

18. The tractor of claim 16, wherein the flexible track includes a groove for side alignment with the drive wheel.

19. A track system for a ground engaging vehicle, comprising:

a number of guide wheels coupled to a guide wheel frame;

a drive wheel, having a drive axis of rotation;

a flexible track that engages the drive wheel and is guided by the number of guide wheels;

a support frame coupled between the ground engaging vehicle and the guide wheel frame, wherein the support frame provides support on both an inside and an outside portion of the drive wheel, wherein at least a portion of the support frame couples to an axle of the ground engaging vehicle; and a track system pivot joint adapted for pivoting below the axle, wherein the track system pivot joint is positioned so that moment forces acting on the track system are essentially canceled out.

20. The track system of claim 19, wherein a track system pivot joint is located between the support frame and the guide wheel frame.

21. A tractor, comprising:

a body portion;

an engine coupled to the body portion;

at least two track systems coupled through a transmission to the engine, each track system including:
 a number of guide wheels coupled to a guide wheel frame;
 a drive wheel for attachment to an axle of the ground engaging vehicle;
 a flexible track that engages the drive wheel and is guided by the number of guide wheels;
 a first support member coupled between the guide wheel frame and the ground engaging vehicle, wherein the first support member provides support from the guide wheel frame to a body portion of the ground engaging vehicle;
 a second support member coupled between the guide wheel frame and the ground engaging vehicle, wherein the second support member provides support from the guide wheel frame to the axle of the ground engaging vehicle.

22. The tractor of claim 21, wherein a track system pivot joint is substantially concentric with the axle of the ground engaging vehicle.

23. The tractor of claim 21, wherein a track system pivot joint is located between the support frame and the guide wheel frame.

* * * * *